(12) United States Patent
Campbell

(10) Patent No.: US 7,125,820 B2
(45) Date of Patent: Oct. 24, 2006

(54) NON-NOBLE METAL CATALYSTS FOR THE OXYGEN REDUCTION REACTION

(75) Inventor: Stephen A Campbell, Maple Ridge (CA)

(73) Assignee: Ballard Power Systems Inc., Burnaby (CA)

( * ) Notice: Subject to any disclaimer, the term of this patent is extended or adjusted under 35 U.S.C. 154(b) by 446 days.

(21) Appl. No.: 10/630,634

(22) Filed: Jul. 29, 2003

(65) Prior Publication Data

US 2004/0096728 A1      May 20, 2004

Related U.S. Application Data

(60) Provisional application No. 60/400,194, filed on Jul. 31, 2002.

(51) Int. Cl.
| | |
|---|---|
| B01J 27/04 | (2006.01) |
| B01J 27/43 | (2006.01) |
| B01J 27/47 | (2006.01) |
| B01J 27/51 | (2006.01) |
| B01J 27/57 | (2006.01) |

(52) U.S. Cl. ............... 502/104; 502/215; 502/216; 502/219; 502/220; 502/222; 423/509; 423/561.1

(58) Field of Classification Search ............ 502/104, 502/215, 216, 219, 22, 222, 220; 429/40; 423/509, 561.1
See application file for complete search history.

(56) References Cited

U.S. PATENT DOCUMENTS

| | | | | |
|---|---|---|---|---|
| 3,907,600 A | * | 9/1975 | Pohl et al. ............ | 429/40 X |
| 4,369,063 A | * | 1/1983 | McGowan, Jr. ............ | 106/1.14 |
| 4,390,514 A | * | 6/1983 | Chianelli et al. ............ | 423/509 |
| 5,219,922 A | * | 6/1993 | Steinberger et al. ........ | 524/785 |
| 6,063,179 A | * | 5/2000 | Schmid et al. .............. | 106/415 |
| 6,166,264 A | * | 12/2000 | Ishii et al. ................... | 568/471 |

FOREIGN PATENT DOCUMENTS

WO    WO 03/004156 A2    1/2003

OTHER PUBLICATIONS

Bron, M. et al., "Influence of Selenium on the Catalytic Properties of Ruthenium-Based Cluster Catalysts for Oxygen Reduction," *J. of Electroanalytical Chemistry* 500:510-517, 2001, month unknown.

Trapp, V. et al., "New Catalysts for Oxygen Reduction Based on Transition-Metal Sulfides," *J. Chem. Soc., Faraday trans.,* 92(21):4311-4319, 1996, month unknown.

Tributsch, H. et al., "Methanol-Resistant Cathodic Oxygen Reduction Catalysts for Methanol Fuel Cells," *J. App. Electrochem.* 31:739-748, 2001, month unknown.

* cited by examiner

*Primary Examiner*—Stephen J. Kalafut
(74) *Attorney, Agent, or Firm*—Seed IP Law Group PLLC

(57) ABSTRACT

Non-noble metal transition metal catalysts can replace platinum in the oxidation reduction reaction (ORR) used in electrochemical fuel cells. A $Ru_xSe$ catalyst is prepared with comparable catalytic activity to platinum. An environmentally friendly aqueous synthetic pathway to this catalyst is also presented. Using the same aqueous methodology, ORR catalysts can be prepared where Ru is replaced by Mo, Fe, Co, Cr, Ni and/or W. Similarly Se can be replaced by S.

19 Claims, 3 Drawing Sheets

NON-NOBLE METAL CATALYSTS FOR THE OXYGEN REDUCTION REACTION

CROSS-REFERENCE TO RELATED APPLICATIONS

This application claims the benefit of U.S. Provisional Patent Application No. 60/400,194 filed Jul. 31, 2002, which application is incorporated herein by reference in its entirety.

BACKGROUND OF THE INVENTION

1. Field of the Invention

The field of the invention relates to non-noble metal catalysts for the oxygen reduction reaction including methods of manufacture.

2. Description of the Related Art

Electrochemical fuel cells convert fuel and oxidant to electricity and reaction product. Solid polymer electrochemical fuel cells generally employ a membrane electrode assembly ("MEA") in which an electrolyte in the form of an ion-exchange membrane is disposed between two electrode layers. The electrode layers are made from porous, electrically conductive sheet material, such as carbon fiber paper or carbon cloth. In a typical MEA, the electrode layers provide structural support to the membrane, which is typically thin and flexible.

The MEA contains an electrocatalyst, typically comprising finely comminuted platinum particles disposed in a layer at each membrane/electrode layer interface, to induce the desired electrochemical reaction. The electrodes are electrically coupled to provide a path for conducting electrons between the electrodes through an external load.

A significant emphasis has been placed to reduce MEA costs by reducing the platinum loading while maintaining or even improving performance and reliability. One approach is to eliminate platinum entirely and replace it with a cheaper alternative catalytic material. In particular, a significant amount of work has been done working on replacing platinum for the oxygen reduction reaction at the cathode.

Aside from cost, platinum catalysts have a further disadvantage when used in direct methanol fuel cells (DMFCs) in which methanol is used as the fuel. Namely, platinum at the cathode oxidizes methanol that crosses over from the anode leading to depolarisation and hence serious power losses in the cell.

Bron et al. (*Journal of Electroanalytical Chemistry* 500, 2001, 510–517) discloses a ruthenium-based catalyst for oxygen reduction. The catalysts were prepared by reacting $Ru_3(CO)_{12}$ with selenium for 20 hours in deaerated xylene under refluxing conditions. The product was filtered, washed with diethylether and dried in an oven at 90° C. to produce a black powder. Bron et al. studied the effect of selenium and found a maximum benefit at about 15 mol % Se though catalytic activity was still observed in a selenium free catalyst. Bron concluded that the catalytic center in the selenium-containing catalyst is different from the catalytic center in the selenium-free catalyst. Selenium was also found to protect the catalyst against electrochemical oxidation and therefore led to enhanced stability.

In a second publication produced by the same group, Tributsch et al. (*Journal of Applied Electrochemistry* 31, 2001, 739–748), found that heating of this product resulted in the loss of carbon species in well defined steps. The first step involved the loss of CO and $CO_2$ between 250 and 350° C. and a second step was observed at temperatures above 600° C. Further, Tributsch et al. found a loss of catalytic activity resulting from the release of carbon species at elevated temperatures. This led Tributsch et al. to propose a complicated catalytic structure comprising a cubane-like organometallic ruthenium-complex on the surface of a ruthenium nanoparticle doped with a chalcogen (selenium or sulfur). Inspiration for this model appears to be an iron hydrogenase from the *Clostridium pasteurianum* bacterium.

In a prior study on a related system, namely a MoRuS and MoRuSe system, Trapp et al. (*J. Chem. Soc*, Faraday Trans. 92(21), 1996, 4311–4319) arrived at significantly different conclusions. In the synthesis carried out by Trapp et al., $Ru_3(CO)_{12}$ and $Mo(CO)_6$ were refluxed in xylene with sulfur or selenium for 20 hours. The catalyst powder was then filtered and dried at room temperature before being introduced into a tubular furnace at 350° C. for one hour. Though Trapp et al. also performed a heating step, instead of reduced catalytic activity as reported by Tributsch et al. supra, Trapp et al. observed improved activity. In fact, such heating step was referred to as "catalyst activation." In addition, Trapp et al. concluded that the Ru species is the active center of the catalyst with some synergistic effects observed between the ruthenium and the molybdenum sites in the mass-transport region. Trapp et al. also found that catalytic activity of the MoRuS was not affected by methanol. Under conditions of simulated methanol cross-over, the activated MoRuS catalyst had a similar activity to platinum. However, similar activity was only observed with methanol present. In the absence of methanol, the activity of activated MoRuS catalyst was significantly worse than platinum.

Despite considerable efforts, a non-noble metal-based catalyst with activity similar to platinum has yet to be developed. In addition, existing synthetic methodologies are directed to experimental scale and, as such, are not necessarily amenable to commercial scale production. For example, metal carbonyls, which are typically used as starting materials, are relatively expensive and typical solvent systems used, namely xylene, are toxic and environmentally damaging. Thus, even if the catalysts were suitable for use in fuel cells, an environmentally friendly synthetic method would be needed.

The present invention fulfills these and other needs and provides further related advantages.

BRIEF SUMMARY OF THE INVENTION

In a first aspect of the present invention, a novel non-noble transition metal catalyst for the oxidation reduction reaction is prepared by:

dissolving selenium and $Ru_3(CO)_{12}$ in an organic solvent;
refluxing the organic solvent;
obtaining a precipitate; and
heating the precipitate to a temperature greater than or equal to 600° C. under an inert atmosphere.

In one embodiment, the organic solvent may be xylene. Furthermore, the temperature for the heating step may be, for example, between 600 and 700° C. Similarly, the heating step may be, for example, for more than 10 hours or it may be for 12 hours. The inert gas may be, for example, nitrogen or argon.

The $Ru_xSe$ catalyst thus prepared has an activity to the oxidation reduction reaction comparable to platinum such that it can be used at the cathode in a polymer electrolyte membrane fuel cell. The $Ru_xSe$ catalyst may be supported on, for example, carbon or unsupported.

In a second aspect of the present invention, the catalyst is prepared using aqueous chemistry by:

dissolving a metal salt in an aqueous solution;
precipitating the metal;

introducing a chalcogen such as sulfur or selenium;

reacting the precipitated metal with the chalcogen by heating under an inert atmosphere.

If the metal salt is a ruthenium salt such as ruthenium(III) chloride, ruthenium(III) nitrate or ruthenium(III) acetate and the chalcogen is selenium, then a $Ru_xSe$ catalyst as above will be synthesized. However, the aqueous methodology allows new non-noble transition metal catalysts to be synthesized where the metal could be molybdenum, iron, cobalt, chromium, nickel and/or tungsten.

Precipitation of the metal may be done by reducing the metal with a reducing agent such as sodium borohydride or formaldehyde. Alternatively, the metal may be precipitated with alkali, for example NaOH or $NaHCO_3$ to precipitate the corresponding metal hydroxide or metal carbonate.

One method of introducing selenium is by dissolving selenium dioxide in the aqueous solution and co-precipitating elemental selenium with the same reducing agent as used for the precipitation of the metal.

Similarly, the catalyst thus prepared has an activity to the oxidation reduction reaction such that it can be used at the cathode in an electrochemical fuel cell.

These and other aspects of the invention will be evident upon reference to the attached drawings and following detailed description.

DETAILED DESCRIPTION OF PREFERRED EMBODIMENTS

Figure 1:
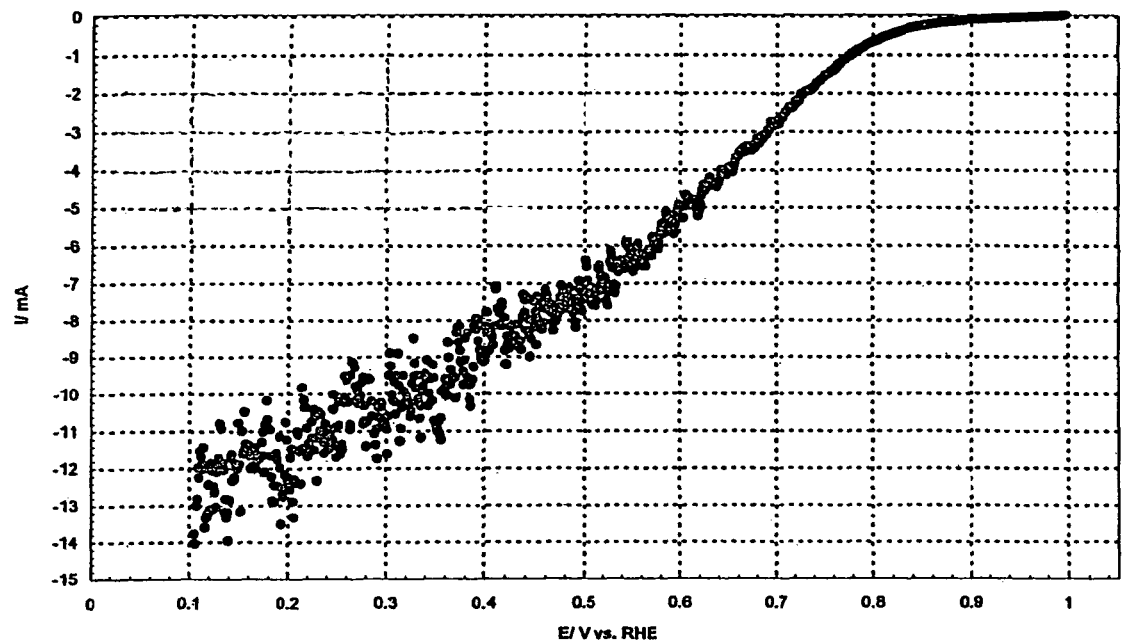
FIG. 1 is a plot illustrating the oxygen reduction current as a function of the applied potential for an unsupported ruthenium-selenium catalyst.

A novel ruthenium-selenium ($Ru_xSe$) catalyst with catalytic activity for the oxygen reduction reaction was synthesized (1) using an organic solvent, namely xylene, and (2) using water as solvent. These catalysts were then tested for their catalytic activity for the oxygen reduction reaction useful in electrochemical fuel cells. The aqueous methodology is also easily amenable to synthesizing a series of novel non-noble transition metal chalcogen catalysts.

Organic Methodologies $Ru_3(CO)_{12}$ may be used as the starting material for the $Ru_xSe$ catalyst and dissolved with selenium in an organic solvent such as xylene. While other suitable organic solvents are well known, the subsequent discussion will only refer to xylene. As selenium may not be readily soluble in xylene, a selenium-xylene mixture may be refluxed for a period of time to effect dissolution before adding any $Ru_3(CO)_{12}$. After the $Ru_3(CO)_{12}$ is added to the reaction mixture, the reaction mixture may be refluxed again for a period of time to effect reaction between ruthenium and selenium. A black precipitate may then be filtered and collected. Complete reaction is not necessary nor required and unreacted selenium may be observed in the black precipitate.

The precipitate is then heated in a furnace under an inert atmosphere, such as, for example, nitrogen. Complete reaction between the ruthenium the selenium occurs as well as activation to produce the $Ru_xSe$ catalyst. In a specific embodiment, heating may be done at a temperature greater than or equal to 600° C., for example, between 600 and 700° C.

Aqueous Methodologies

As mentioned above, heating of the $Ru_xSe$ catalyst completes reaction between the ruthenium and selenium and causes decarbonylation. However, it is unnecessary to begin with the relatively expensive starting material of $Ru_3(CO)_{12}$ if the final step causes decarbonylation. An alternate synthesis involves the same heating of a ruthenium compound in the presence of elemental selenium through a more environmentally friendly aqueous methodology.

The first step involves precipitation of a ruthenium salt in aqueous solution. The ruthenium salt may be any ruthenium salt such as, for example, ruthenium(III) chloride, ruthenium (III) nitrate or ruthenium(III) acetate. In a specific embodiment, the ruthenium salt is ruthenium(III) chloride, as it is the least expensive and the most readily available ruthenium salt. Precipitation may be carried out with a suitable reducing agent such as, for example, formaldehyde or sodium borohydrides to produce a metal precipitate. Alternatively, an alkali solution, for example NaOH or $NaCO_3$, may be used to precipitate ruthenium hydroxide or ruthenium carbonate, respectively.

In one embodiment, elemental selenium is produced by the addition of selenium dioxide to the aqueous solution prior to reduction of the ruthenium salt. In water, selenium dioxide dissolves to produce selenous acid, which in turn precipitates to the elemental selenium when reduced by, for example, $NaBH_4$.

After precipitation, the reaction mixture is filtered and heated in a furnace under an inert atmosphere, such as, for example, nitrogen. The ruthenium deposit decomposes and reacts with the elemental selenium to produce the $Ru_xSe$ catalyst. In a specific embodiment, heating may be done at a temperature greater than or equal to 600° C., for example, between 600 and 700° C.

Not only does the above aqueous synthesis avoid both the use of the costly starting material $Ru_3(CO)_{12}$, but it also avoids the use of a toxic and dangerous solvent system, namely refluxing xylene. As such, the above aqueous synthesis of a $Ru_xSe$ catalyst is not only environmentally friendly but also amenable to large-scale commercial production.

Sulfur may also be used instead of or in addition to selenium as ruthenium is known to react preferably with sulfur as compared to selenium (see, e.g., Trapp et al., supra). Precipitation of elemental sulfur in aqueous solution is likely to be impractical and, as such, a more specific method involves directly adding colloidal sulfur to the ruthenium solution prior to precipitation of the metal so that the ruthenium and sulfur are combined within a single powder. The colloidal sulfur can be produced from, for example, polysulfide alkaline solutions. If sulfur is used as the chalcogen, hydrogen should be avoided in the heating step as sulfur reacts with hydrogen to produce hydrogen sulfide. In contrast, selenium would not be expected to appreciably react with hydrogen.

In addition to substitution of the chalcogen, novel catalysts can be synthesized in which ruthenium is replaced by other non-noble transition metals such as molybdenum, iron, cobalt, chromium, nickel and/or tungsten. Without being limited thereto, examples of suitable salts would include: ammonium molybdate, ammonium iron (III) citrate, ammonium cobalt(II) sulfate hexahydrate, ammonium tungstate, and cobalt (II) nitrate hexahydrate. As with ruthenium, either one of selenium or sulfur or both may be used. Further, mixed catalytic systems wherein the catalyst contains more than one non-noble transition metal may also be synthesized by dissolving and precipitating a mixture of at least two different metal salts in the aqueous solution. While not being bound by theory, the chalcogen appears to stabilize the transition metal such that it does not dissolve within the acidic environment of an electrochemical fuel cell. This allows a greater variety of non-noble transition metals to be used as catalysts for the oxygen reduction reaction.

EXAMPLE 1

Synthesis of Unsupported $Ru_xSe$ with an Organic Solvent 0.15 g Se was added to 100 ml xylene and refluxed under bubbling nitrogen overnight before being allowed to cool to room temperature. 2.85 g $Ru_3(CO)_{12}$ was then added to the reaction mixture and refluxed under nitrogen for a further 20 hours. A black precipitate was then washed and dried. On grinding, the black precipitate was found to contain reddish brown streaks that was presumed to be unreacted elemental selenium. The material was then heated under nitrogen to 600° C. in a quartz tube furnace for 12 hours. After heating, the $Ru_xSe$ powder was completely black without any reddish brown streaks thereby indicating complete reaction.

EXAMPLE 2

Synthesis of Carbon Supported $Ru_xSe$ with an Aqueous Solvent 1.0361 g Vulcan XC72R carbon was added to 1l water in a 4l beaker. 0.4034 g $RuCl_3$ and 0.1071 g $SeO_2$ were dissolved in 500 ml water and subsequently added to the 4l beaker. Wetting was assured by adding 100 ml propan-1-ol and then stirred at 80° C. for 1 hour. The mixture was then allowed to cool to room temperature. A 1l solution of 0.1M $NaBH_4$ in 0.2M NaOH was added to the beaker and allowed to react slowly. Excess $NaBH_4$ was removed by heating to 80° C. for 5 minutes and cooling. The powder was then filtered and washed in water and dried at 80° C. overnight. The powder was then placed in a quartz lined tube furnace under nitrogen and heated at 15° C. $min^{-1}$ to 600° C. and held at 600° C. for 2 hours. The catalyst was then removed from the furnace, cooled and ground to a fine powder.

EXAMPLE 3

Synthesis of Carbon Supported Ru Catalyst

The same methodology for synthesizing the $Ru_xSe$ catalyst of Example 2 was employed except that no $SeO_2$ was added to the reaction mixture.

EXAMPLE 4

Preparation of Electrode for Testing Oxygen Reduction Reaction Activity

The catalyst powders were tested for oxygen reduction reaction activity. Catalyst powder was dispersed in glacial ethanoic acid and a portion thereof deposited onto a clean gold mesh electrode. After drying with a stream of warm air, the electrode was then placed in a standard three electrode cell containing 0.5M $H_2SO_4$ as electrolyte, a gold wire counter electrode and a reversible hydrogen reference electrode. After bubbling with oxygen gas to saturate the acid, the potential was swept at 5 $mVs^{-1}$ from 1.0V to 0.1V vs RHE to give the oxygen reduction current as a function of the applied potential.

Figure 2:
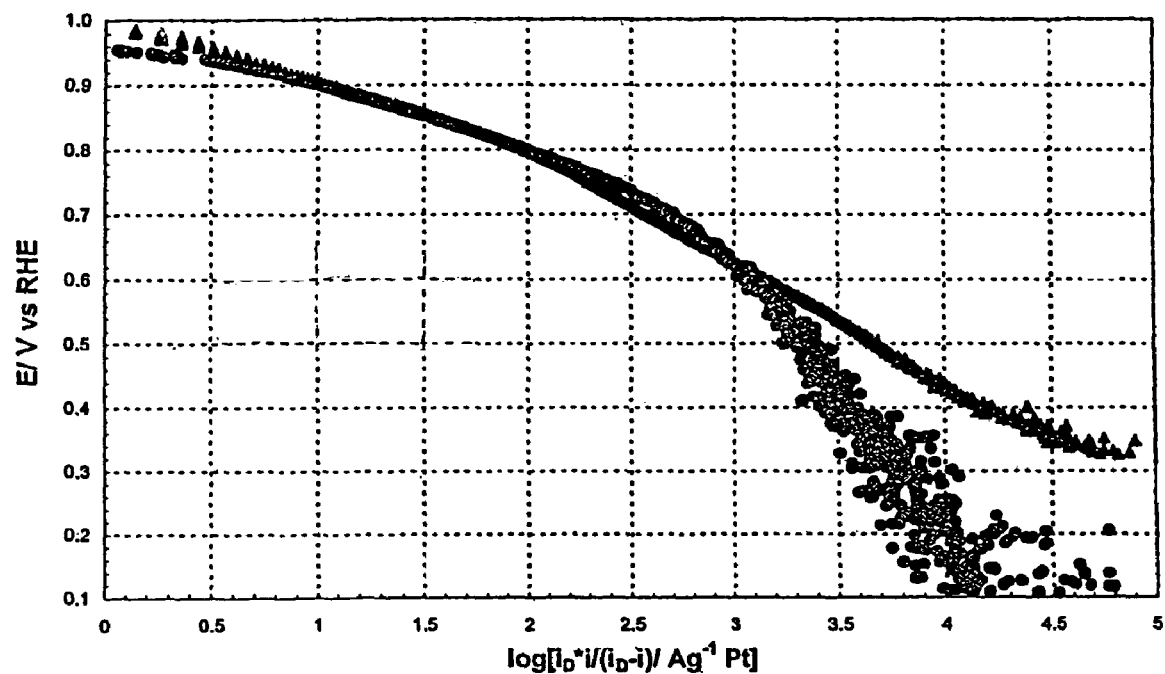
FIG. 2 is a corrected Tafel plot for mass activity of the ruthenium-selenium catalyst in FIG. 1 and a supported platinum catalyst.

FIG. 1 illustrates the oxygen reduction current as a function of the applied potential for the unsupported $Ru_xSe$ catalyst. To compare the activity of the unsupported $Ru_xSe$ catalyst with platinum, a Tafel plot was prepared as in FIG. 2. In both of FIGS. 1 and 2, λ is used to indicate the unsupported $Ru_xSe$ catalyst and σ indicates a baseline measurement of a platinum catalyst supported on XC72R carbon supplied by Johnson Matthey Inc. As the platinum was supported by carbon and the $Ru_xSe$ catalyst was unsupported, the results as illustrated in FIG. 2 are normalized by mass of actual metal present. FIG. 2 indicates that on a mass basis, the $Ru_xSe$ catalyst is comparable in activity as platinum for the oxygen reduction reaction. Further observations of the $Ru_xSe$ catalyst indicated that the particle size was very small, i.e., less than 50 nm in diameter. Further, no dissolution of the $Ru_xSe$ catalyst was observed during electrochemical experiments as may be expected with elemental ruthenium. Without being bound by theory, this indicates an increased stability of the catalyst as compared to elemental ruthenium. From the amounts of starting material used, the unsupported $Ru_xSe$ catalyst would have a Ru:Se ratio of approximately 7:1.

Figure 3:
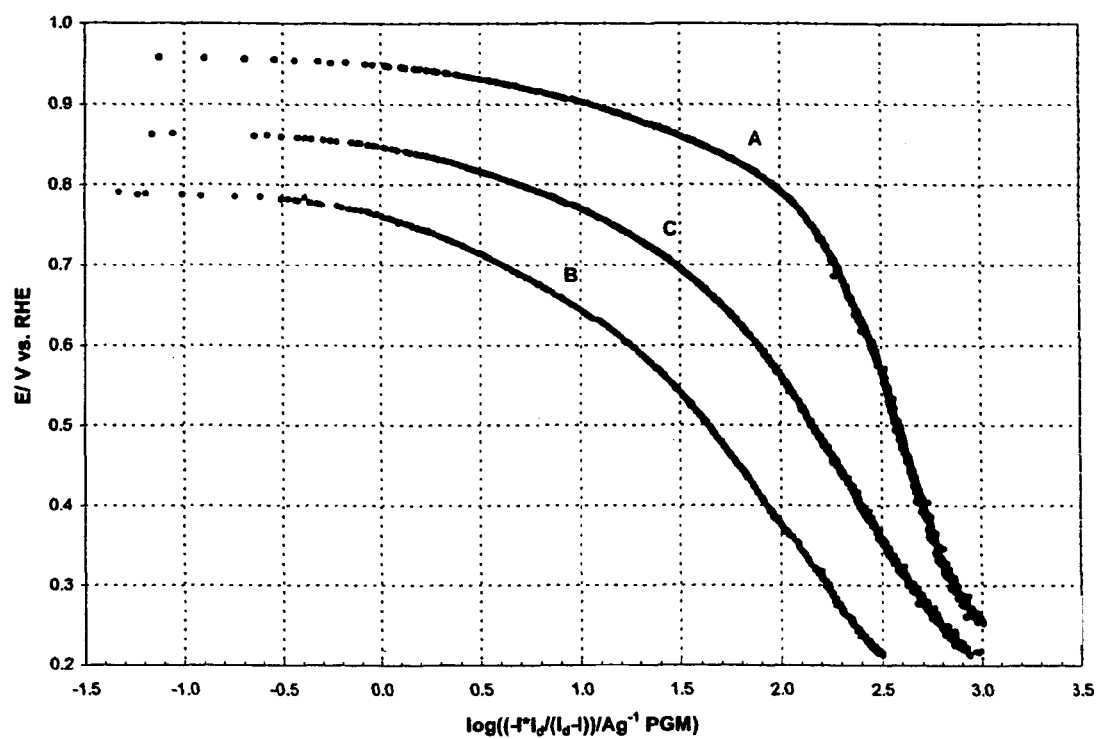
FIG. 3 is a corrected Tafel plot for oxygen reduction catalysts supported on carbon in 0.5M sulfuric acid at room temperature comparing the activities of platinum, ruthenium and ruthenium-selenium catalysts.

FIG. 3 illustrates a corrected Tafel plot for oxygen reduction catalysts supported on carbon in 0.5M sulfuric acid at room temperature comparing the activities of supported $Ru_xSe$ catalyst with platinum and elemental ruthenium catalysts. Plot A illustrates the results obtained for 40% Pt on XC72R carbon (supplied by Johnson Matthey) whereas plot B is for 40% Ru on XC72R carbon and plot C is for 40% $Ru_xSe$ on XC72R carbon. FIG. 3 also illustrates two key features in addition to the points raised above with respect to the unsupported $Ru_xSe$ catalyst. First, FIG. 3 is a more accurate comparison between the activities of the catalysts as compared to FIG. 2 as all catalysts are supported. The activity of the supported $Ru_xSe$ catalyst is shown to approach the activity of the supported platinum catalyst and represents an improvement in activity and stability as compared to the supported Ru catalyst. Second, the aqueous methodology used to make the $Ru_xSe$ produces an active catalyst in a relatively environmentally friendly and cost effective manner.

While particular steps, elements, embodiments and applications of the present invention have been shown and described, it will be understood, of course, that the invention is not limited thereto since modifications may be made by persons skilled in the art, particularly in light of the foregoing teachings. It is therefore contemplated by the appended claims to cover such modifications as incorporate those steps or elements that come within the spirit and scope of the invention.

What is claimed is:

1. A method for preparing a non-noble transition metal catalyst for the oxidation reduction reaction comprising:
   dissolving selenium and $Ru_3(CO)_{12}$ in an organic solvent;
   refluxing the organic solvent;
   obtaining a precipitate; and
   heating the precipitate to a temperature greater than or equal to 600° C. under an inert atmosphere.

2. The method of claim 1 wherein the organic solvent is xylene.

3. The method of claim 1 wherein the temperature is between 600 and 700° C.

4. The method of claim 1 wherein the heating step is for more than 10 hours.

5. The method of claim 4 wherein the heating step is for about 12 hours.

6. The method of claim 1 wherein the inert atmosphere is nitrogen.

7. A method for preparing a non-noble transition metal catalyst for the oxidation reduction reaction comprising:
   dissolving a metal salt in an aqueous solution, the metal is ruthenium, molybdenum, iron, cobalt, chromium, nickel or tungsten;
   precipitating the metal;
   introducing a chalcogen, the chalcogen being sulfur or selenium; and
   reacting the precipitated metal with the chalcogen by heating under an inert atmosphere.

8. The method of claim 7 wherein the precipitating the metal step comprises adding a reducing agent to the aqueous solution.

9. The method of claim 8 wherein the reducing agent is sodium borohydride or formaldehyde.

10. The method of claim 7 wherein the introducing a chalcogen step comprises adding selenium dioxide to the aqueous solution prior to the precipitating step.

11. The method of claim 10 wherein the precipitating the metal step also causes precipitation of elemental selenium.

12. The method of claim 7 wherein the introducing a chalcogen step comprises adding colloidal sulfur to the aqueous solution prior to the precipitating step.

13. The method of claim 7 wherein the precipitating the metal step comprises adding an alkali solution to the aqueous solution.

14. The method of claim 13 wherein the alkali solution is sodium hydroxide or sodium bicarbonate.

15. The method of claim 7 wherein the metal salt is a ruthenium salt.

16. The method of claim 15 wherein the ruthenium salt is ruthenium(III) chloride, ruthenium(III) nitrate or ruthenium(III) acetate.

17. The method of claim 7 wherein the metal salt is a mixture of at least two different metal salts.

18. The method of claim 7 wherein the heating step is to a temperature greater than or equal to 600° C.

19. The method of claim 18 wherein the heating step is to a temperature between 600° C. and 700° C.

* * * * *